(12) United States Patent
Sato et al.

(10) Patent No.: US 7,497,295 B2
(45) Date of Patent: Mar. 3, 2009

(54) MOTORCYCLE HAVING A SUPPORT FOR CONTROLLING VIBRATIONS TRANSMITTED TO A SEAT THEREOF

(75) Inventors: Katsumi Sato, Saitama (JP); Hiroshi Yamaura, Saitama (JP); Naohisa Okawada, Saitama (JP); Keikichi Shimokobe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 352 days.

(21) Appl. No.: 11/391,461

(22) Filed: Mar. 29, 2006

(65) Prior Publication Data
US 2006/0219457 A1  Oct. 5, 2006

(30) Foreign Application Priority Data
Mar. 30, 2005  (JP) .............................. 2005-099708

(51) Int. Cl.
*B62K 11/00* (2006.01)
(52) U.S. Cl. .................. 180/219; 180/228; 280/283
(58) Field of Classification Search ................. 180/219, 180/228; 280/283
See application file for complete search history.

(56) References Cited

U.S. PATENT DOCUMENTS

| | | | | |
|---|---|---|---|---|
| 4,678,054 A | * | 7/1987 | Honda et al. | 180/225 |
| 4,684,144 A | * | 8/1987 | Tanaka | 280/281.1 |
| 4,727,953 A | * | 3/1988 | Kudo et al. | 180/219 |
| 4,742,884 A | * | 5/1988 | Ishikawa | 180/219 |
| 4,744,434 A | * | 5/1988 | Miyakoshi et al. | 180/219 |
| 4,809,999 A | * | 3/1989 | Tozawa et al. | 280/281.1 |

FOREIGN PATENT DOCUMENTS

JP  2002-317645 A  10/2002

\* cited by examiner

*Primary Examiner*—Paul N Dickson
*Assistant Examiner*—Michael R Stabley
(74) *Attorney, Agent, or Firm*—Birch, Stewart, Kolasch & Birch, LLP

(57) ABSTRACT

In a motorcycle in which an engine body of an internal combustion engine is rubber-mounted on a vehicle body frame, to permit the rider(s) to enjoy a feeling of pulses. A rod-like frame member mounted at its one end to an engine body is abutted at its other end on a bottom plate of a rider's seat.

19 Claims, 5 Drawing Sheets

MOTORCYCLE HAVING A SUPPORT FOR CONTROLLING VIBRATIONS TRANSMITTED TO A SEAT THEREOF

CROSS-REFERENCE TO RELATED APPLICATIONS

This nonprovisional application claims priority under 35 U.S.C. § 119(a) on Patent Application No. 2005-099708, filed in Japan on Mar. 30, 2005, the entirety of which is incorporated herein by reference.

BACKGROUND OF THE INVENTION

1. Field of the Invention

The present invention relates to a motorcycle. In particular, the present invention relates to an improvement in a motorcycle for controlling the vibrations transmitted to a rider or riders.

2. Description of Background Art

A motorcycle having a reciprocating internal combustion engine mounted thereto is known. The reciprocating internal combustion engine uses a balancer for damping the vibration generated from the reciprocating motion (see, for example, Japanese Patent Laid-open No. 2002-317645).

It is possible to reduce the vibration transmitted to a rider(s) by mounting the reciprocating internal combustion engine having a balancer as described above. However, in the case of a motorcycle, the pleasure of the feeling of pulses arising from vibrations and sounds may also be desired, depending on the model of the motorcycle.

In order for the vibration generated at the internal combustion engine to be transmitted to the rider(s) through a rider's seat, it suffices to mount the internal combustion engine directly to a vehicle body frame. In this case; however, the vibration generated from the internal combustion engine leads to the generation of resonance of each part, so that it is necessary to take a countermeasure against the resonance of each part. On the other hand, where the internal combustion engine is rubber-mounted on the vehicle body frame, much of the vibration generated at the internal combustion engine is damped, making it impossible for the rider(s) to get a comfortable feeling of pulses.

SUMMARY OF THE INVENTION

The present invention has been made in consideration of the above-mentioned circumstances. Accordingly, it is an object of the present invention to provide a motorcycle permitting the rider(s) to enjoy a feeling of pulses.

In order to attain the above object, a first aspect of the present invention resides in a motorcycle including a vehicle body frame for mounting thereon an engine body of an internal combustion engine, wherein a rod-like frame member mounted at one end thereof to the engine body is abutted at the other end thereof on a bottom plate of a rider's seat.

In addition, according to a second aspect of the present invention, an elastic member is interposed between the other end of the frame member and a bottom plate of the rider's seat.

According to a third aspect of the present invention, the one end of the frame member is mounted to a lower portion of the engine body.

In order to attain the above object, a fourth aspect of the present invention resides in a motor cycle including a vehicle body frame for mounting an internal combustion engine thereon, the vehicle body frame including: a head pipe for steerably bearing a front fork for rotatably supporting a front wheel; a pivot plate for turnably bearing a front portion of a swing arm for rotatably supporting a rear wheel by a rear portion thereof; a main frame for connection between the head pipe and the pivot plate; and a seat rail extended rearwards from an upper portion of the pivot plate so as to support a rider's seat, wherein the main frame and the seat rail are connected to each other through a transmission member.

According to a fifth aspect of the present invention, one end of the transmission member is connected to the main frame in the vicinity of the internal combustion engine, and the other end of the transmission member is connected to the seat rail on the lower side of the rider's seat.

According to a sixth aspect of the present invention, the internal combustion engine is of the single cylinder type.

According to the first aspect of the present invention, the vibration transmitted from the engine body to the vehicle body frame can be damped by the rubber mount structure, the vibration from the internal combustion engine can be transmitted directly to the rider's seat side through the rod-like frame member, and the motorcycle can be run while the rider(s) enjoys the feeling of pulses arising from the vibration and sounds.

According to the second aspect of the present invention, the high-frequency component of the vibration transmitted through the frame member can be damped by the elastic member, and only a comfortable vibration can be transmitted to the rider's seat side.

According to the third aspect of the present invention, the longitudinal vibration on the engine body side which is generated substantially along the extension direction of the frame member can be efficiently transmitted to the rider's seat side, and the rider(s) on the rider's seat can enjoy the longitudinal vibration which is more sensible than the transverse vibration.

According to the fourth aspect of the present invention, the vibration transmitted from the internal combustion engine to the main frame can be transmitted directly to the seat rail through the transmission member, whereby the motorcycle can be run while the rider(s) enjoys the feeling of pulses arising from the vibration and sounds.

According to the fifth aspect of the present invention, the portion, near the internal combustion engine, of the main frame is a portion to which the vibration is easily transmitted from the internal combustion engine side, so that the vibration can be efficiently transmitted to the rider's seat side.

According to the sixth aspect of the present invention, the internal combustion engine is of the single cylinder type wherein pulsed vibration is liable to be generated, whereby the rider(s) can enjoy more the feeling of pulses.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
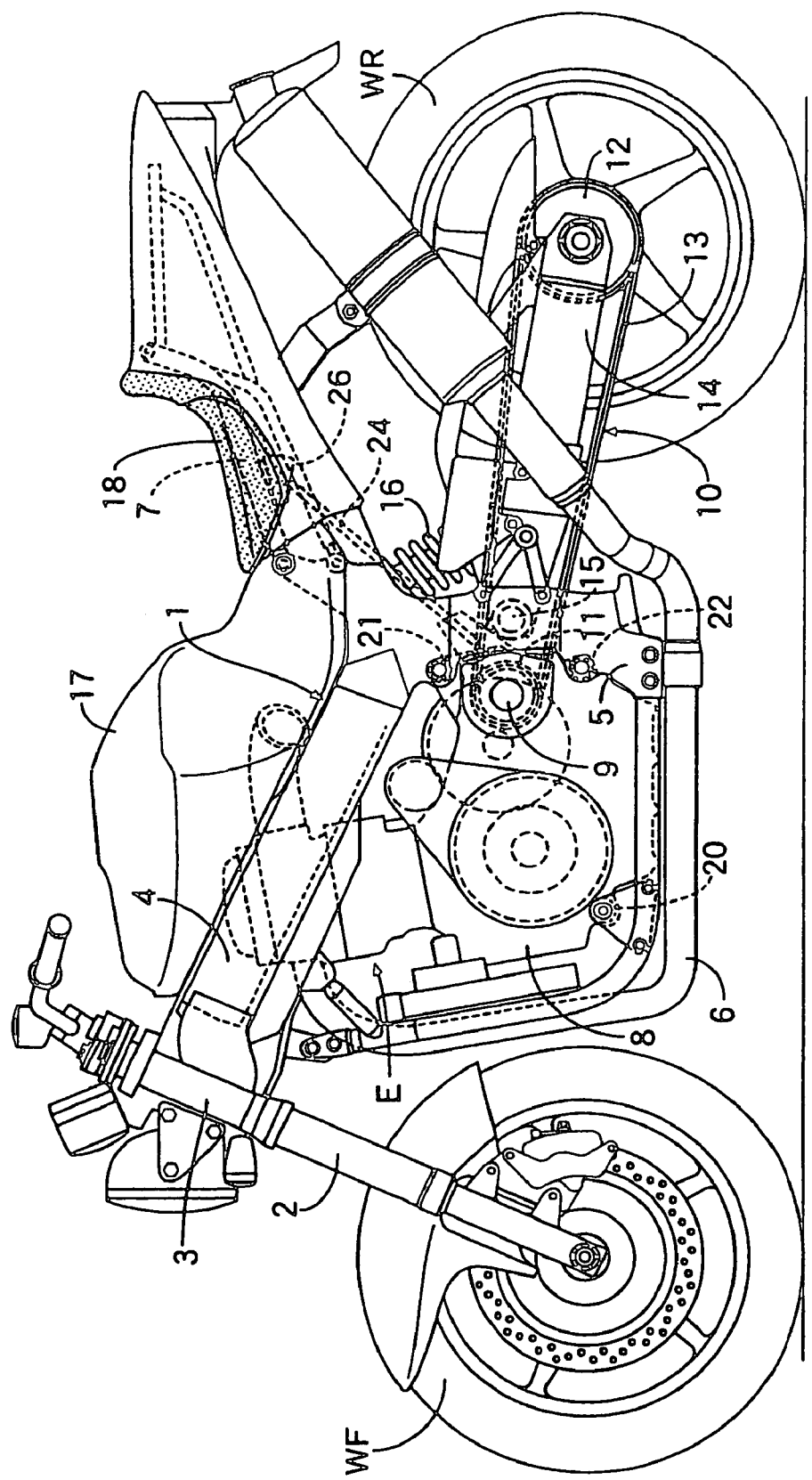
FIG. 1 is a side view of a motorcycle according to a first embodiment of the present invention.

The present invention will now be described with reference to the accompanying drawings, wherein the same or similar elements will be identified with the same reference numerals.

Figure 2:
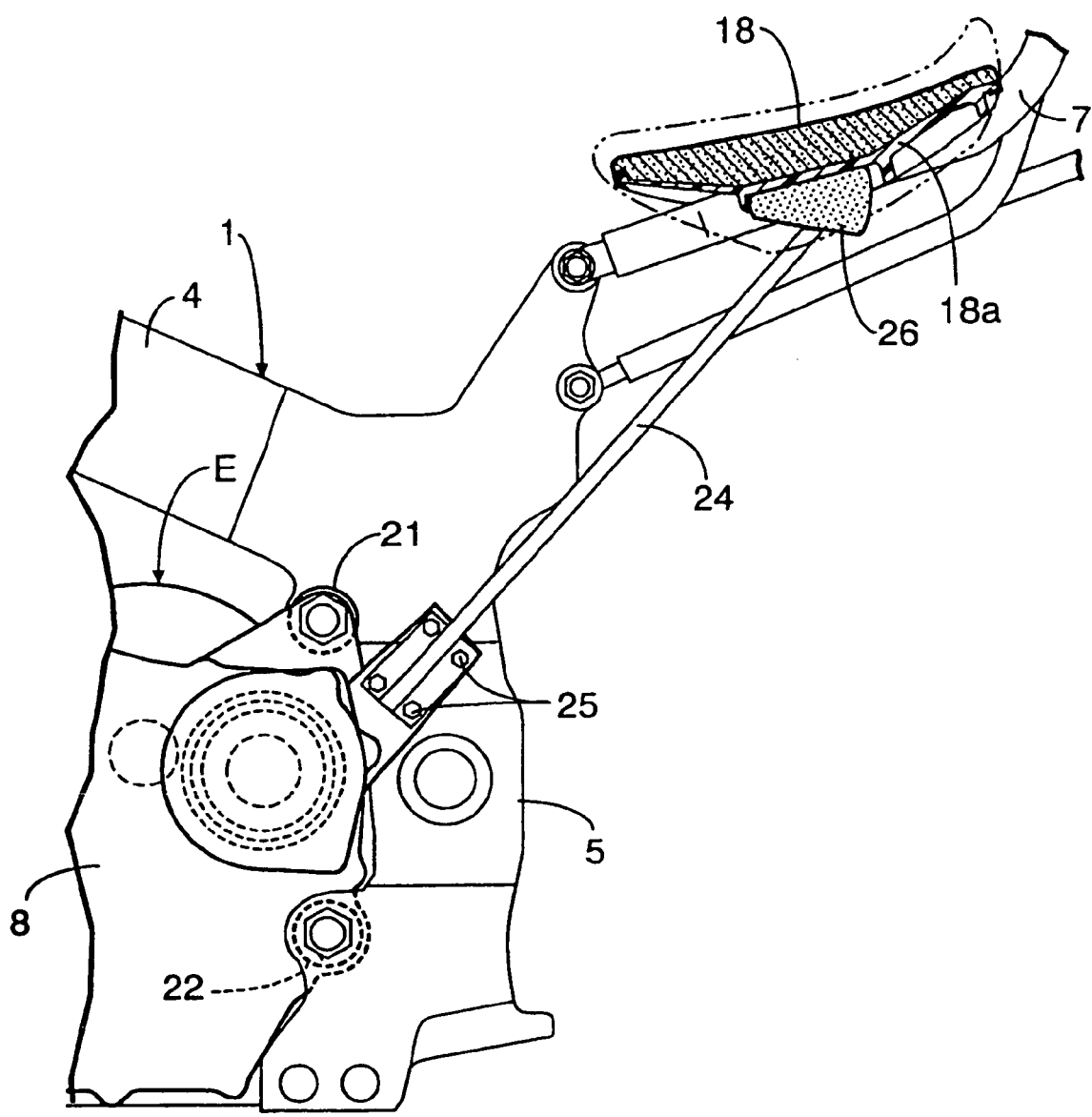
FIG. 2 is a vertically sectional side view of the motorcycle.

FIGS. 1 and 2 show a first embodiment of the present invention, in which FIG. 1 is a side view of a motorcycle, and FIG. 2 is a vertically sectional side view of a major part of the motorcycle.

First, in FIG. 1, a vehicle body frame 1 of the motorcycle includes a head pipe 3 for steerably bearing a front fork 2 for rotatably supporting a front wheel WF. A left-right pair of main frames 4 extends rearwardly downward from the head pipe 3. Pivot plates 5 are joined to the rear ends of the main frames 4 and extend downwards. Down pipes 6 have front half portions extending downwards from front portions of the main frames 4, a rear half portion extending rearwards substantially horizontally, and intermediate portions bent for connection between front portions of the main frames 4 and lower portions of the pivot plates 5. Seat rails 7 extend rearwardly upwards from upper portions of the pivot plates 5.

An engine body 8 of an internal combustion engine E of the single cylinder type is rubber-mounted on the vehicle body frame 1. Specifically, a front-side lower portion of the engine body 8 is supported on the intermediate portions of the down pipes 6 through rubber elements 20. A rear-side upper portion of the engine body 8 is mounted on upper portions of the pivot plates 5 through rubber elements 21. A rear-side lower portion of the engine body 8 is mounted on lower portions of the pivot plates 5 through rubber elements 22. It should be noted that the rubber elements 20, 21 and 22 could be made of other elastic materials as well, as long as the material is sufficient to damp vibrations.

The power from an output shaft 9 of a transmission incorporated in the engine body 8 is transmitted through a chain transmission 10 to a rear wheel WR. The chain transmission 10 is composed of a drive sprocket 11 fixed to the output shaft 9, a driven sprocket 12 fixed to the rear wheel WR, and an endless chain 13 wrapped around the sprockets 11 and 12.

In addition, front end portions of swing arms 14 are swingably mounted on the pivot plates 5 through a support shaft 15. The rear wheel WR is rotatably supported by rear end portions of the swing arms 14. A rear cushion 16 is provided between front portions of the swing arms 14 and the vehicle body frame 1.

A fuel tank 17 is mounted on the main frames 4 so as to cover the internal combustion engine E from above. A rider's seat is disposed on the rear side of the fuel tank 17 for seating the rider(s) thereon. The rider's seat is supported by the seat rails 7.

Referring to FIG. 2, one end of the rod-like frame member 24 is mounted to the engine body 8 by a plurality of bolts 25. The other end of the frame member 24 is abutted on a bottom plate 18a of the rider's seat.

One end of the frame member 24 is mounted to the right rear side of a lower portion of the engine body 8. In addition, an elastic member 26 is attached to the other end of the frame member 24. The elastic member 26 is interposed between the other end of the frame member 24 and the bottom plate 18a of the rider's seat 18.

The functions of the first embodiment will now be described. The rod-like frame member 24 is connected at one end to the engine body 8 that is rubber-mounted on the vehicle body frame 1. The rod-like frame member 24 is also abutted at an opposite end on the bottom plate 18a of the rider's seat 18. Therefore, the vibration transmitted from the engine body 8 to the vehicle body frame 1 can be damped by the rubber mount structure, the vibration from the internal combustion engine E can be directly transferred to the rider's seat 18 side through the rod-like frame member 24, and the motorcycle can be run while the rider(s) enjoys the feeling of pulses arising from the vibration and sounds.

In addition, the elastic member 26 is interposed between the other end of the frame member 24 and the bottom plate 18a of the rider's seat 18. Therefore, the high-frequency component of the vibration transmitted through the frame member 24 is damped by the elastic member 26, and only comfortable vibration can be transmitted to the rider's seat 18 side.

Furthermore, the one end of the frame member 24 is mounted to a lower portion of the engine body 8. Therefore, the longitudinal vibration on the engine body 8 side that is generated substantially along the extension direction of the frame member 24 can be efficiently transmitted to the rider's seat 18 side, and the rider(s) on the rider's seat 18 can enjoy longitudinal vibration, which is more comfortable than transverse vibration.

Moreover, the internal combustion engine E is of the single cylinder type, which is liable to generate pulsed vibration. Therefore, the rider(s) can enjoy the feeling of pulses more.

Figure 3:
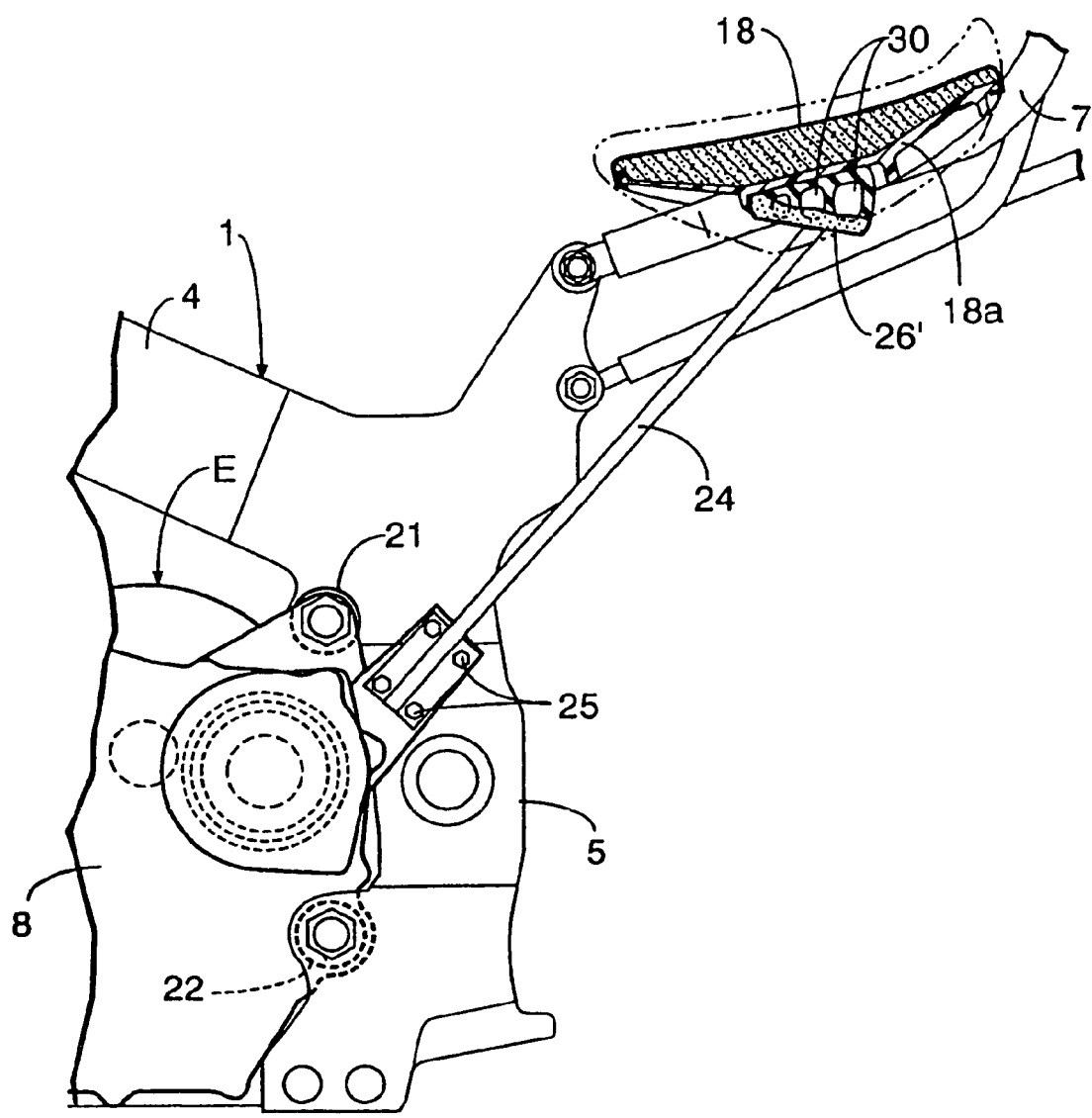
FIG. 3 is a sectional view, corresponding to FIG. 2, of a modification of the first embodiment.

As a modification of the first embodiment, as shown in FIG. 3, the elastic member 26' interposed between the frame member 24 and the bottom plate 18a of the rider's seat 18 may be provided with a plurality of cavities 30, whereby the damping characteristics of the elastic member 26' can be modified by changing the number and shape of the cavities 30. In addition, the damping characteristics can also be modified by changing the hardness of the elastic member 26, 26' or by using a foamed rubber.

Figure 4:
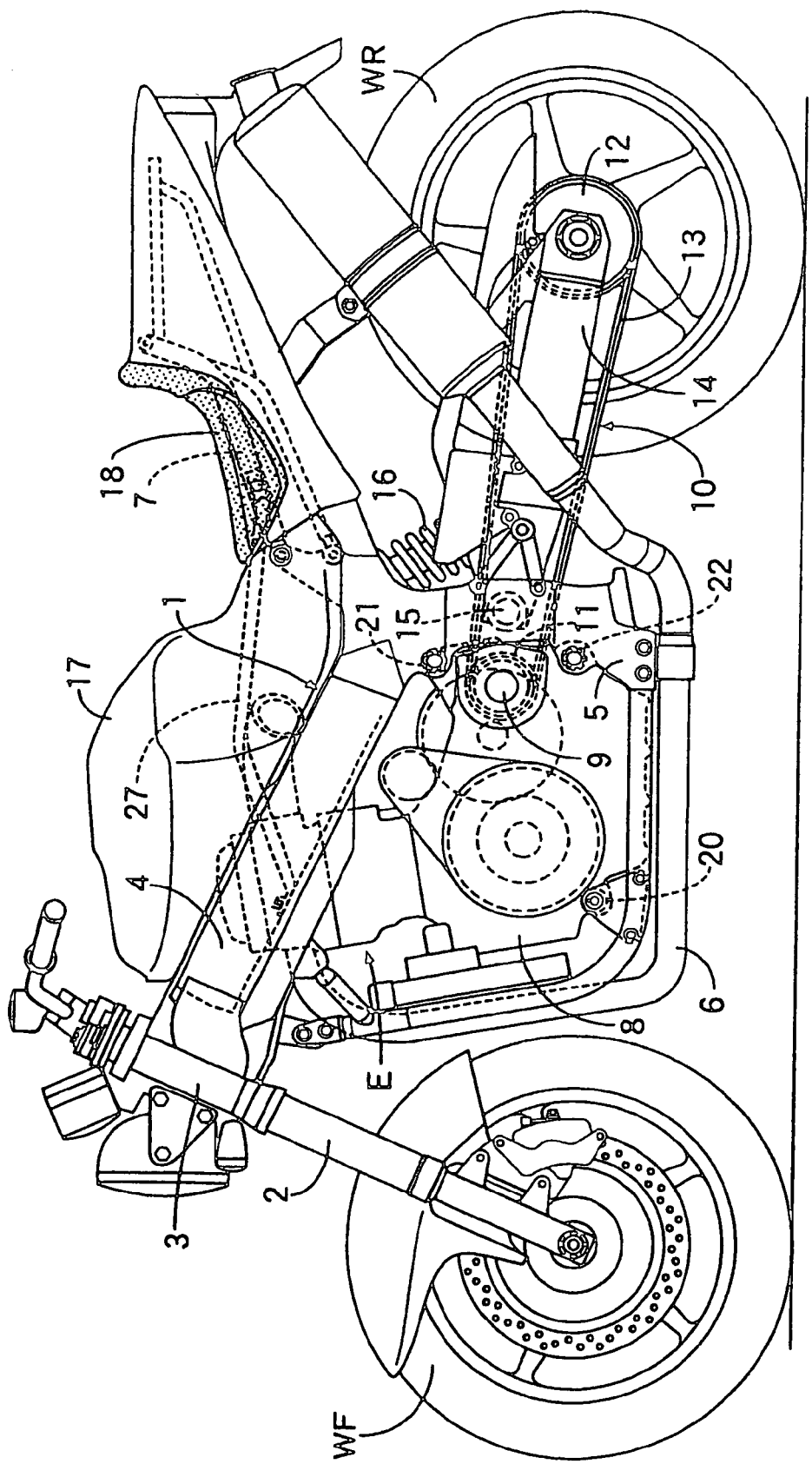
FIG. 4 is a side view of a motorcycle according to a second embodiment of the present invention.
Figure 5:
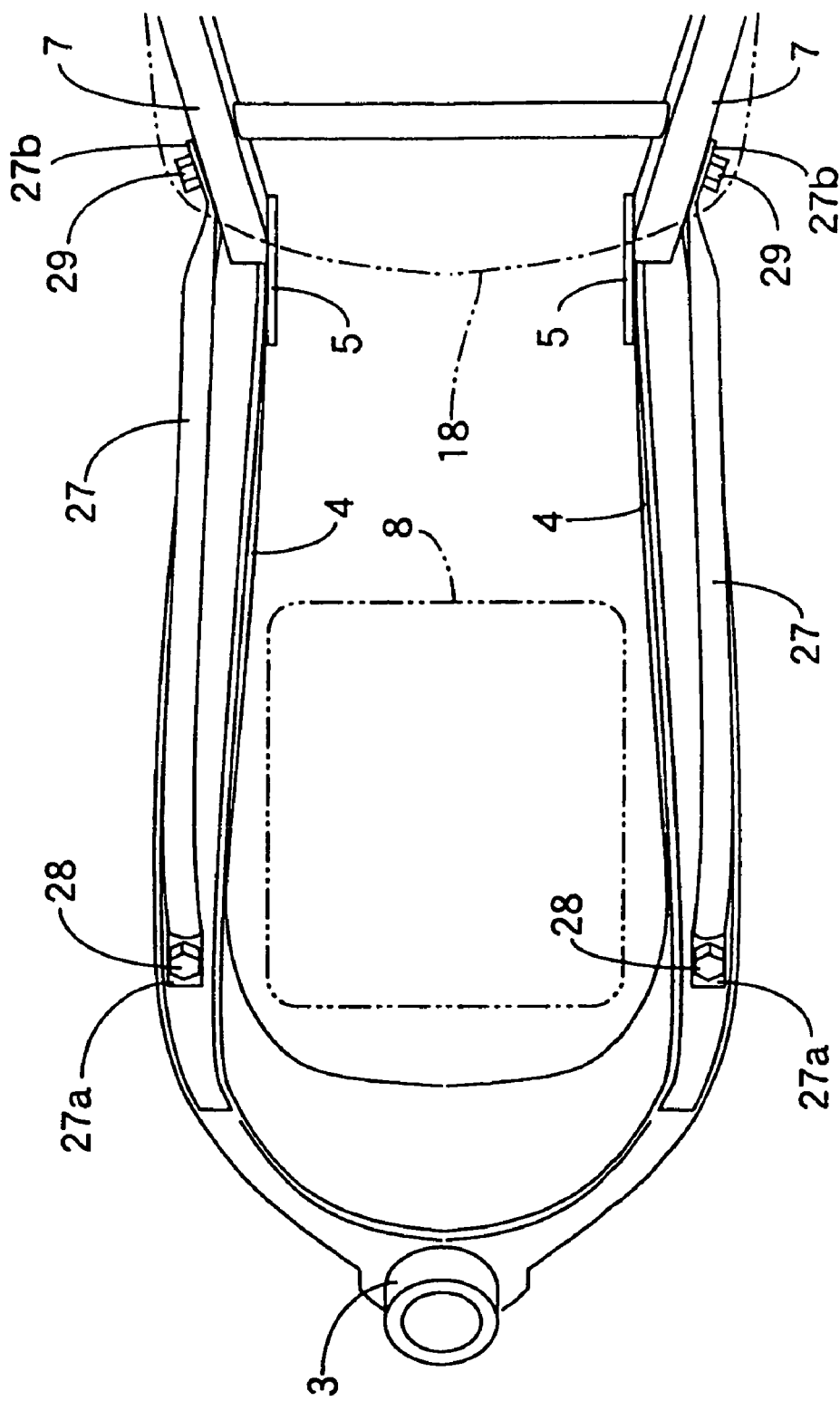
FIG. 5 is a plan view of a front portion of a vehicle body frame.

A second embodiment of the present invention will now be described with reference to FIGS. 4 and 5, in which FIG. 4 is a side view of a motorcycle, and FIG. 5 is a plan view of a front part of a vehicle body frame. Portions corresponding to those in the first embodiment are only shown in the figures using the same reference numerals, and detailed description thereof is omitted.

The main frames 4 by which the pivot plates 5 for turnably bearing a front portion of the swing arm 14 to the head pipe 3, and the seat rails 7 extended rearwards from upper portions of the pivot plates 5 so as to support the rider's seat 18 are connected to each other by a left-right pair of transmission members 27, 27 disposed on the lower side of the fuel tank 17.

The transmission members 27 are each formed from a pipe member having an intermediate portion so bent as to extend a front half portion forwardly downwards and to extend a rear half portion substantially horizontally. A mount portion 27a at one end of the transmission member 27 that is formed in a flat shape by flattening the pipe member is connected to the main frame 4 by a bolt 28 in the vicinity of the internal combustion engine E. A connection portion 27b at the other end of the transmission member 27 that is formed in a flat shape by flattening the pipe member is connected to the seat rail 7 by a bolt 29 on the lower side of the rider's seat 18.

According to the second embodiment, the main frames 4 and the seat rails 7 are connected to each other by the transmission members 27, whereby the vibrations transmitted from the internal combustion engine E to the main frames 4 are directly transmitted to the seat rails 7 through the transmission members 27, and the motorcycle can be run while the rider(s) enjoys the feeling of pulses arising from the vibrations and sounds.

Meanwhile, portions, near the internal combustion engine E, of the main frames 4 are portions to which the vibrations are easily transmitted from the internal combustion engine E side. In this case, one-side ends of the transmission members 27 are connected to the main frames 4 in the vicinity of the internal combustion engine 27 and the other ends of the transmission members 27 are connected to the seat rails 7 on the lower side of the rider's seat 18. Therefore, the vibrations can be efficiently transmitted to the rider's seat 18 side.

As a further embodiment of the present invention, a configuration may be adopted in which the rod-like frame member 24 mounted at its one end to the engine body E is abutted at its other end on the bottom plate 18a of the rider's seat 18, and the main frames 4 and the seat rails 7 are connected to each other through the transmission members 27.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle, comprising:
   a vehicle body frame having a pair of seat rails;
   a seat mounted on the seat rails of the vehicle body frame, said seat having a bottom plate;
   an engine body of an internal combustion engine, said engine body being mounted on the vehicle body frame; and
   a frame member, said frame member being mounted at one end thereof to said engine body and abutting at another end thereof on said bottom plate of said seat,
   wherein vibrations are transmitted directly from the engine to the seat via the frame member.

2. The motorcycle according to claim 1, wherein an elastic member is interposed between said other end of said frame member and said bottom plate of said seat.

3. The motorcycle according to claim 1, wherein said one end of said frame member is mounted to a lower portion of said engine body.

4. The motorcycle according to claim 2, wherein said one end of said frame member is mounted to a lower portion of said engine body.

5. The motorcycle according to claim 1, wherein said internal combustion engine is of the single cylinder type.

6. The motorcycle according to claim 1, wherein the engine body is mounted to the vehicle body frame by elastic members to damp vibrations from the internal combustion engine.

7. The motorcycle according to claim 2, wherein said elastic member includes a plurality of cavities formed therein to control the damping characteristics of the elastic member.

8. The motorcycle according to claim 1, wherein the frame member is in the shape of a rod, the rod extending directly from the engine body to the bottom plate of the seat.

9. A motor cycle, comprising:
   a vehicle body frame for mounting an internal combustion engine thereon, said vehicle body frame including:
   a head pipe for steerably bearing a front fork for rotatably supporting a front wheel;
   a pivot plate for turnably bearing a front portion of a swing arm for rotatably supporting a rear wheel by a rear portion thereof;
   a main frame for connection between said head pipe and said pivot plate; and
   a seat rail directly connected to and extending rearwards from an upper portion of said pivot plate so as to support a seat,
   wherein said main frame and said seat rail are connected to each other through a transmission member;
   wherein one end of said transmission member is connected to said main frame in the vicinity of said internal combustion engine, and the other end of said transmission member is connected to said seat rail on the lower side of said seat.

10. The motorcycle according to claim 9, wherein said internal combustion engine is of the single cylinder type.

11. The motorcycle according to claim 9, wherein there are a pair of said transmission members, each of said transmission members being formed from a pipe member and having mount portions at opposite ends thereof formed in a flat shape by flattening the pipe member.

12. The motorcycle according to claim 9, wherein a frame member is mounted at one end thereof to the internal combustion engine and is abutted at another end thereof on a bottom plate of the seat.

13. The motorcycle according to claim 12, wherein an elastic member is interposed between said other end of said frame member and said bottom plate of said seat.

14. The motorcycle according to claim 12, wherein said one end of said frame member is mounted to a lower portion of said internal combustion engine.

15. The motorcycle according to claim 13, wherein said one end of said frame member is mounted to a lower portion of said internal combustion engine.

16. The motorcycle according to claim 12, wherein the internal combustion engine is mounted to the vehicle body frame by elastic members to damp vibrations from the internal combustion engine.

17. The motorcycle according to claim 13, wherein said elastic member includes a plurality of cavities formed therein to control the damping characteristics of the elastic member.

18. The motorcycle according to claim 12, wherein the frame member is in the shape of a rod, the rod extending directly from the internal combustion engine to the bottom plate of the seat.

19. A motorcycle, comprising:
   a vehicle body frame;
   a seat mounted on the vehicle body frame, said seat having a bottom plate;
   an engine body of an internal combustion engine, said engine body being mounted on the vehicle body frame;
   a frame member, said frame member being mounted at one end thereof to said engine body and abutting at another end thereof on said bottom plate of said seat; and
   an elastic member interposed between said other end of said frame member and said bottom plate of said seat.

* * * * *